US 6,545,864 B2

(12) United States Patent
Davis, IV

(10) Patent No.: US 6,545,864 B2
(45) Date of Patent: Apr. 8, 2003

(54) NOTEBOOK COMPUTER STAND

(75) Inventor: Chester Arthur Davis, IV, Ada, OK (US)

(73) Assignee: Tri-Stand, Inc., Ada, OK (US)

( * ) Notice: Subject to any disclaimer, the term of this patent is extended or adjusted under 35 U.S.C. 154(b) by 0 days.

(21) Appl. No.: 09/798,467

(22) Filed: Mar. 1, 2001

(65) Prior Publication Data

US 2002/0122290 A1 Sep. 5, 2002

(51) Int. Cl.[7] .................................................. G06F 1/16
(52) U.S. Cl. ...................... 361/683; 361/790; 360/97.8; 248/65
(58) Field of Search ................................ 361/683–686, 361/724–727, 679–680, 784, 790, 760; 360/97.8; 248/65

(56) References Cited

U.S. PATENT DOCUMENTS 6,208,508 B1 * 3/2001 Ruch et al. ................. 361/686
6,266,241 B1 * 7/2001 Van Brocklin et al. ..... 361/687
6,290,534 B1 * 9/2001 Sadler ......................... 439/534
6,309,230 B2 * 10/2001 Helot ........................... 439/131

* cited by examiner

Primary Examiner—Darren Schuberg
Assistant Examiner—Hung Van Duong
(74) Attorney, Agent, or Firm—Exclusivity-Law, Inc.; James T. Robinson

(57) ABSTRACT

A notebook computer stand for a notebook computer provides a U-shaped pocket and a support. The U-shaped pocket receives the relatively thicker frame portion of the notebook computer housing the keyboard, the CPU, the mouse, and related hardware. The notebook computer's hinged display is deployed above the pocket for ease of viewing. In one embodiment, the notebook computer stand includes a storage compartment, cable slots for routing cables connected to the notebook computer, and height adjusters for varying the height of the computer stand and, indirectly, the viewing angle of the display.

16 Claims, 5 Drawing Sheets

NOTEBOOK COMPUTER STAND

BACKGROUND OF THE INVENTION

1. Field of the Invention

This invention relates to computer stands and the like and, more particularly, but not by way of limitation, to a stand for a notebook computer.

2. Discussion

It is known in the art relating to computers to provide a notebook computer. A notebook computer is a relatively smaller computer which includes an integral CPU, keyboard, mouse, hard drive, floppy drive, CD-ROM or DVD drive, rechargeable battery, and video output device (also referred to as a display)—all powered by either an internal battery or a single AC power connection. Notebook computers differ from personal computers (commonly referred to as PCs), consisting of individual components which are connected to provide a computer system. A PC monitor may weigh 20–40 pounds, while the unit containing the CPU, hard drive(s), CD-ROM, battery, and floppy drive may weigh 20–30 pounds. The PC keyboard and PC mouse are separate units. Over the last 10–15 years, such relatively smaller computers have been called laptop computers (sometimes shortened to "laptops") and, more recently, notebook computers (sometimes shortened to "notebooks"). Notebook computers currently range in weight from about five to seven pounds. The general field in which notebook computers and laptop computers are used is referred to in the industry as mobile computing or portable computing.

Notebook computers are commonly used by professionals in a variety of fields, but they are especially useful to individuals who work both in a business office and also at home. College professors, attorneys, accountants, corporate managers at all levels, marketing personnel, and medical personnel, among others, have found notebook computers to be especially useful because notebook computers can be easily transported with them to any work location. Similarly, software development professionals routinely carry notebook computers with them so they are available at any time and at any location.

Notebook computers offer many advantages, and they also have limitations. The integration of keyboard and mouse into a single package, for example, limits the size of the keyboard and the type of mouse. Many notebooks incorporate an eraser-type mouse amid the keys in the keyboard with left and right mouse buttons below the space bar of the keyboard. Other notebooks incorporate an input device which is actuated by the user's hand on a pad located on the integrated unit. Most professionals-and software developers, in particular-prefer a conventional mouse of the type used with PCs. Likewise, most notebook users prefer a conventional PC keyboard. As a result of these preferences, many notebook users carry with them a conventional keyboard and a conventional mouse, both of which can be connected to the notebook and utilized in lieu of the integrated keyboard and mouse. Many notebook users keep a conventional keyboard and a conventional mouse at home while keeping another conventional keyboard and another conventional mouse at the office, thereby permitting them to transport a relatively compact notebook computer while retaining the ease of use of a conventional keyboard and mouse.

When a conventional PC keyboard and a conventional PC mouse are connected to a notebook computer, the notebook computer's integrated mouse and keyboard are disabled. The notebooks' keyboard and mouse may actually be in the way, yet the notebook's screen is still required for use of the notebook. Many users experience difficulty in finding a comfortable arrangement of the conventional PC keyboard and the conventional PC mouse together with the notebook computer and its display. The problems and limitations associated with use of a conventional PC keyboard and a conventional PC mouse are overcome by applicant's notebook computer stand.

SUMMARY OF THE INVENTION

The present invention provides a computer stand for a notebook computer. A U-shaped pocket receives the relatively thicker frame portion of the notebook computer housing the keyboard, the CPU, the mouse, and related hardware. The notebook computer's hinged display is deployed above the pocket for ease of viewing. In one embodiment, the notebook computer stand includes a storage compartment, cable slots for routing cables connected to the notebook computer, and height adjusters for varying the height of the computer stand and, indirectly, the viewing angle of the display.

An object of the present invention is to provide a computer stand which facilitates use of a state-of-the-art notebook computer in conjunction with a conventional PC keyboard and a conventional PC mouse.

Yet another object of the present invention is to provide a notebook computer stand which organizes cables attached to the notebook computer so the cable remain in an organized arrangement when the notebook computer is disconnected and transported to a remote location.

Yet another object of the invention is to provide a notebook computer stand which includes a storage compartment for storing connecting cables.

Yet another object of the invention is to provide a notebook computer stand which permits adjustment of the height and viewing angle of the notebook computer's display.

Other objects, features, and advantages of the present invention will become clear from the following description of the preferred embodiment when read in conjunction with the accompanying drawings and appended claims.

DETAILED DESCRIPTION OF THE INVENTION

In the following description of the invention, like numerals and characters designate like elements throughout the figures of the drawings.

Figure 1:
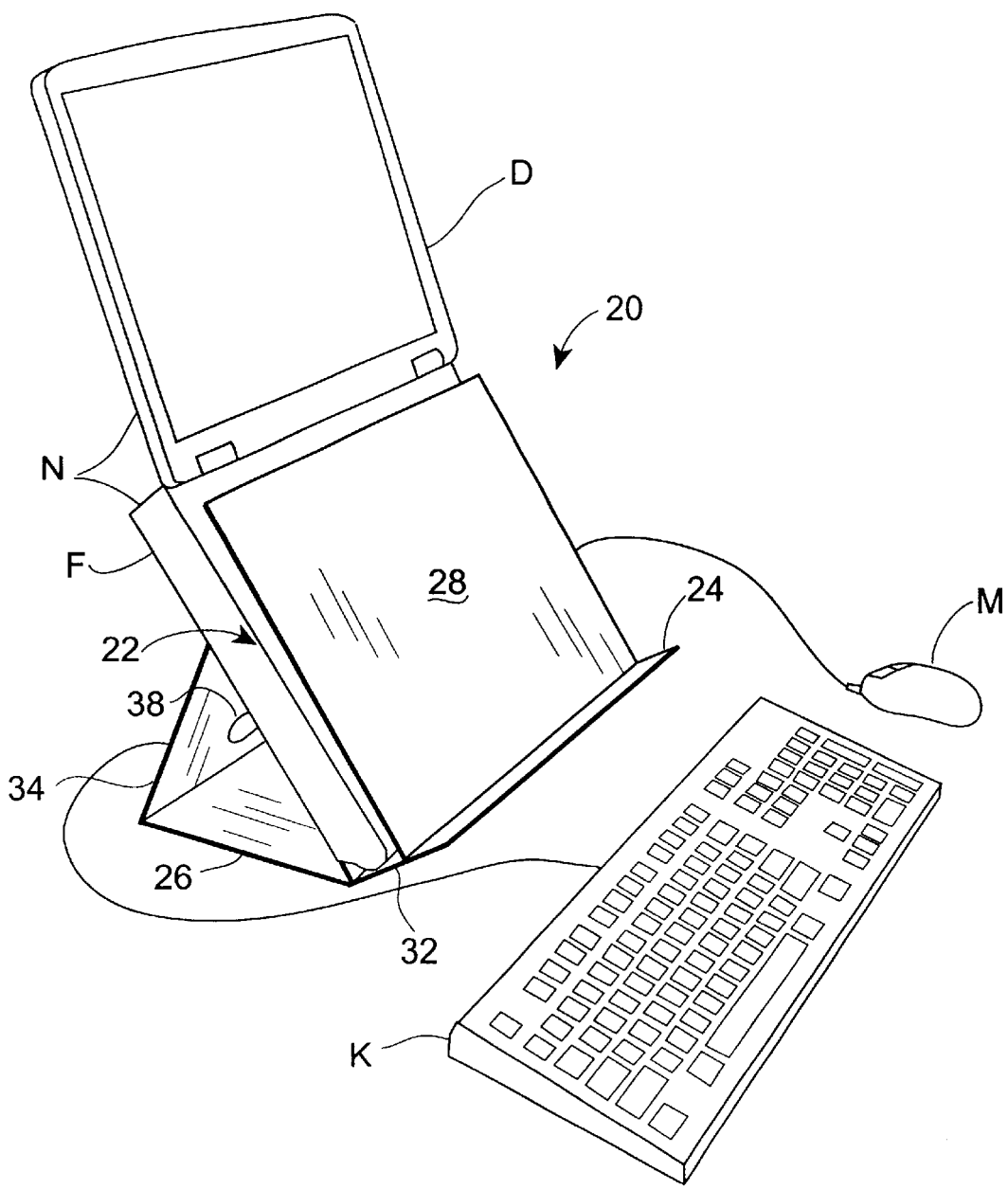
FIG. 1 is a pictorial view of the notebook computer stand of the present invention.

Referring generally to the drawings and more particularly to FIGS. 1–5, a notebook computer stand 20 includes a generally U-shaped pocket 22 having a lip 24. The pocket 22 is attached to a support 26. The notebook computer stand 20 is shown as it is intended to be used with a notebook computer N having a relatively thinner display D hinged to a relatively thicker frame portion F. The frame portion F of the notebook computer N is received by the pocket 22, and the display D is deployed in an upright position for viewing by the user. In FIG. 1, a keyboard K and a mouse M are attached to appropriate connections on the back of the frame portion F of the notebook computer N.

Figure 2:
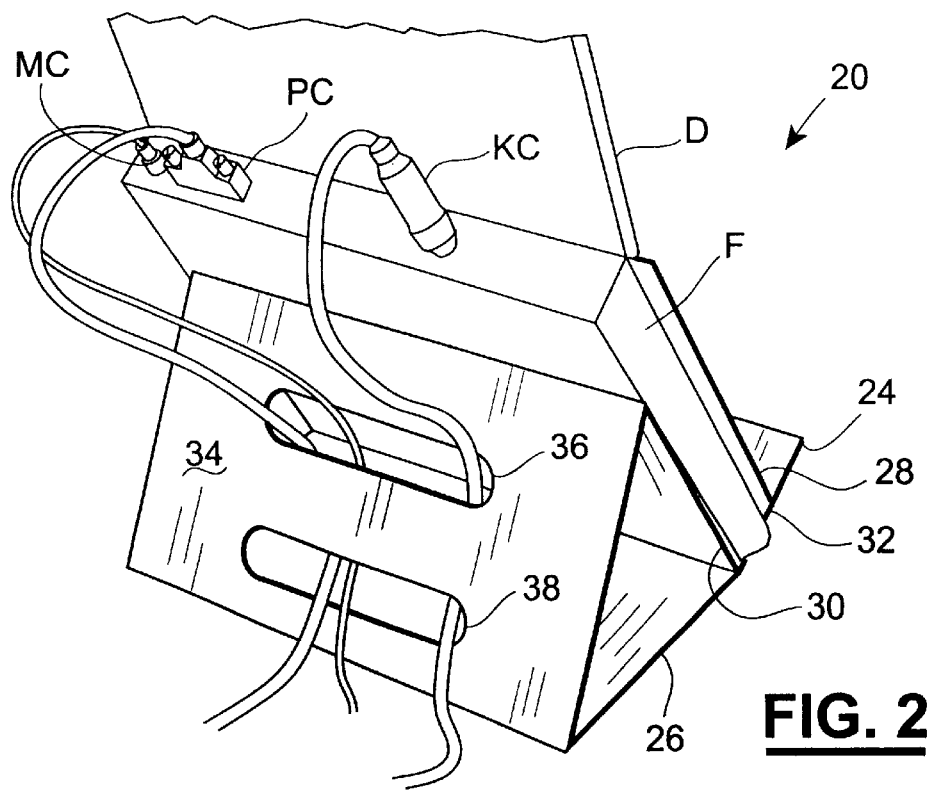
FIG. 2 is back pictorial view of the notebook computer stand of FIG. 1.

Referring now to FIG. 2, the pocket 22 of notebook computer stand 20 is formed by a front member 28, a back member 30, and a bottom 32. The front member 28 and the back member 30 are generally parallel one to the other.

Still referring to FIG. 2, a cable guide 34 attached to the support 26 and the back member 30 includes an upper slot 36 and a lower slot 38. For purposes of illustration, a mouse connector MC, a keyboard connector KC, and a printer connector PC are threaded through the upper slot 36 and the lower slot 38.

As previously stated, notebook computer users frequently prefer to use a conventional PC keyboard and a conventional PC mouse. Slots 36 and 38 preserve the general arrangement of keyboard, mouse, printer, and other cables when the user disconnects the notebook computer N for transport to a remote location.

Figure 3:
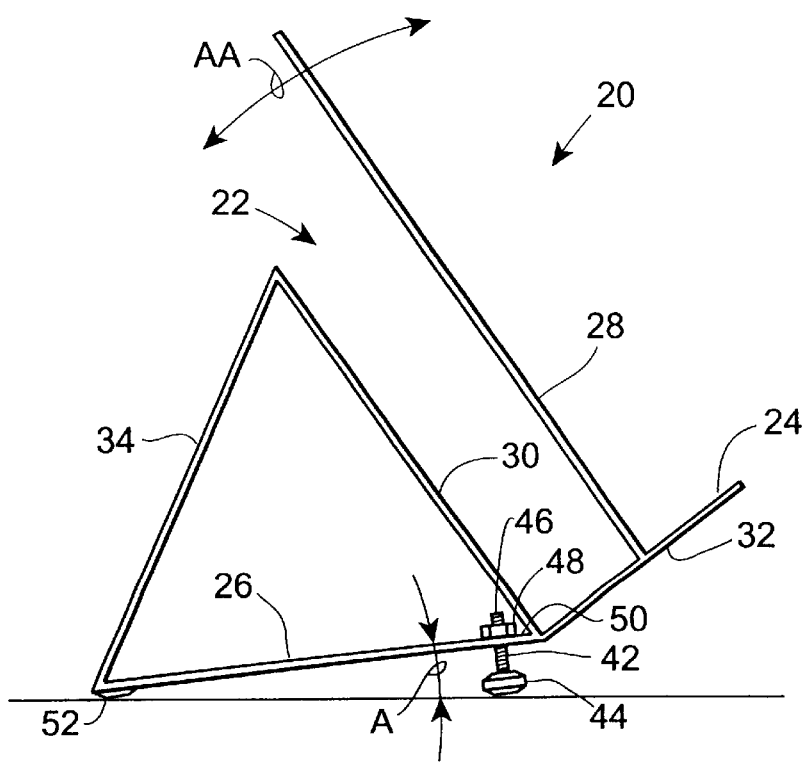
FIG. 3 is a view showing one end of the notebook computer stand of FIG. 1 with a height adjuster added to permit adjustment of the angle at which the display D is deployed.
Figure 4:
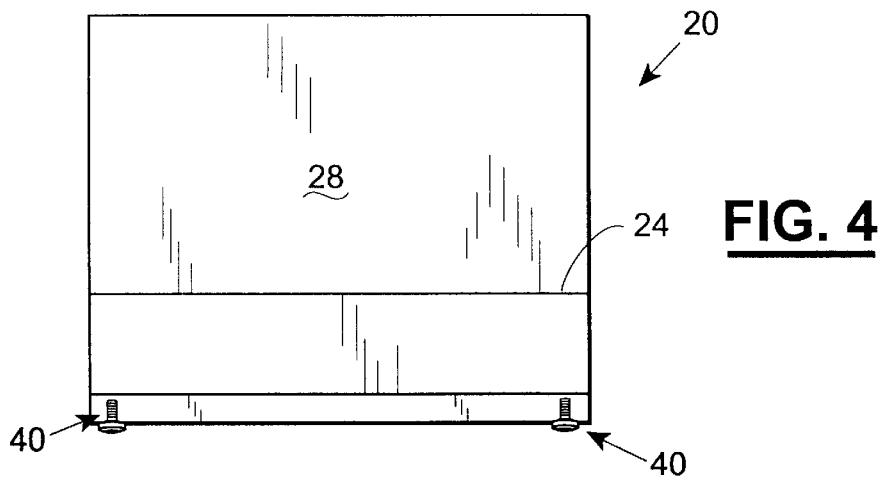
FIG. 4 is a front view of the notebook computer stand of FIG. 1.
Figure 5:
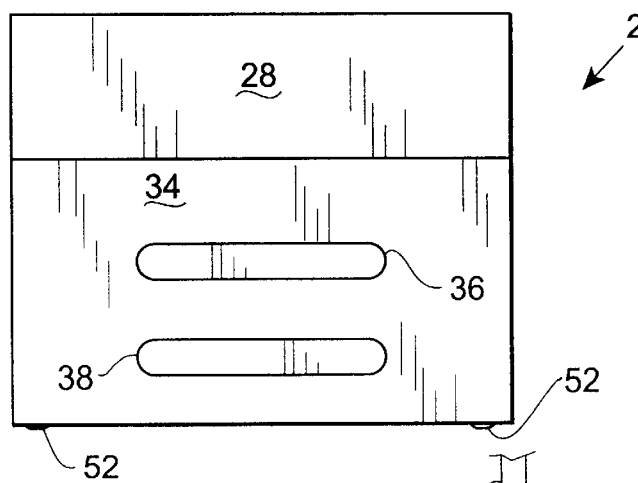
FIG. 5 is a rear view of the notebook computer stand of FIG. 1.

In FIGS. 3–5, the notebook computer stand 20 of the present invention includes two height adjusters 40. The height adjusters 40 include threaded bolts 42 having a head (not shown) enclosed in rubber enclosures 44. The threaded portion 46 extends through a bore in the support 26 and is held in place by a nut 48 which is spot welded to the support 26. Adjustment of the threaded bolt 42 in the nut 48 raises and lowers the height of the front To portion 50 of the base 26 along A and produces a corresponding movement of the pocket 22 along M, thereby adjusting the position of the notebook computer display D. Two pads 52 (See FIG. 5) near the rear portion 54 of the base 26, together with the rubber enclosures 44, prevent scratching of the work surface by the base 26.

Figure 6:
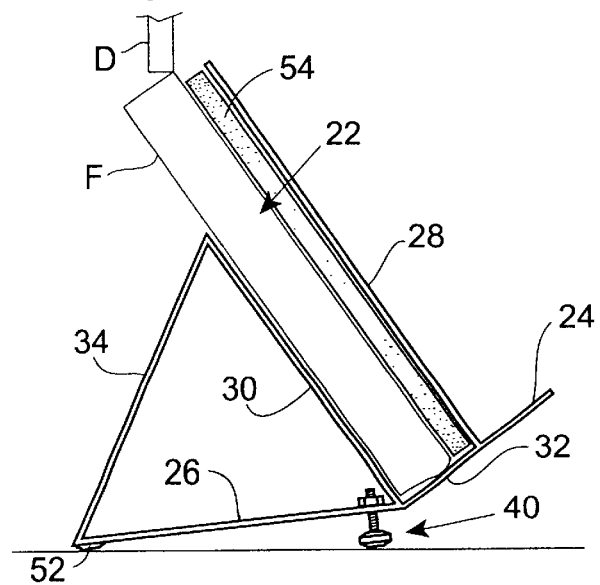
FIG. 6 is a view of the notebook computer stand of FIG. 1 with a spacer added to prevent accidental depression of the notebook keyboard and mouse keys.

Referring now to FIG. 6, a spacer 54 prevents the keys on the notebook computer keyboard from being accidentally depressed by biasing the frame portion F of the notebook computer N against the back member 30 of the pocket 22.

It will be understood by one skilled in the art that the spacer 54 can be formed of any suitable material, including, but not limited to, hard rubber, foam rubber, or plastic. Further, the spacer 54 could be formed from a narrow metal strip. In any case, the spacer 54 is attached to the front member 28 so as to force the frame portion F against the back member 30 of the pocket 22.

Figure 7:
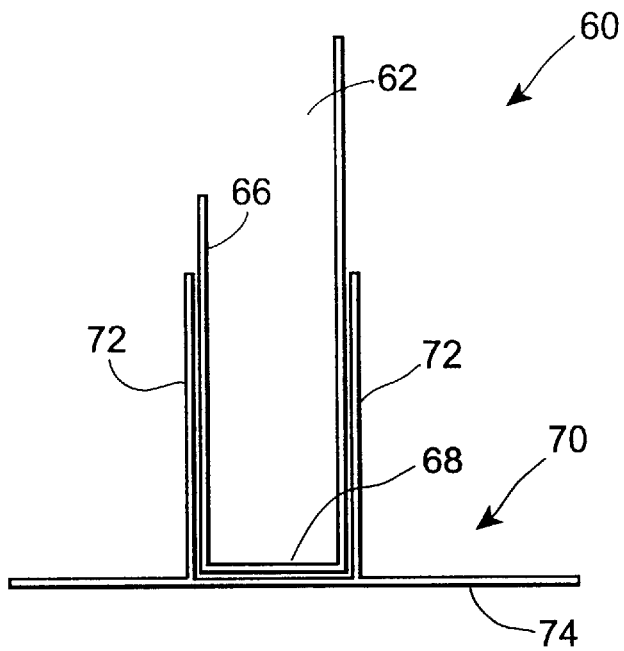
FIG. 7 is an end view of a second embodiment of the notebook computer stand of the present invention in which a pocket is disposed within a support.

Referring now to FIG. 7, another embodiment 60 of the notebook computer stand according to the present invention includes a pocket 62 formed from a front 64 and a back 66 attached to a bottom 68. The pocket 62 is disposed in a support 70. The support 70 is formed by two vertical members 72 attached to a horizontal base 74. In use, the frame portion F of the notebook computer N is received in the pocket 62, and the hinged display D (See FIG. 1) is deployed in the use position for viewing. The pocket is maintained in a stable upright position by the vertical members 72.

Figure 8:
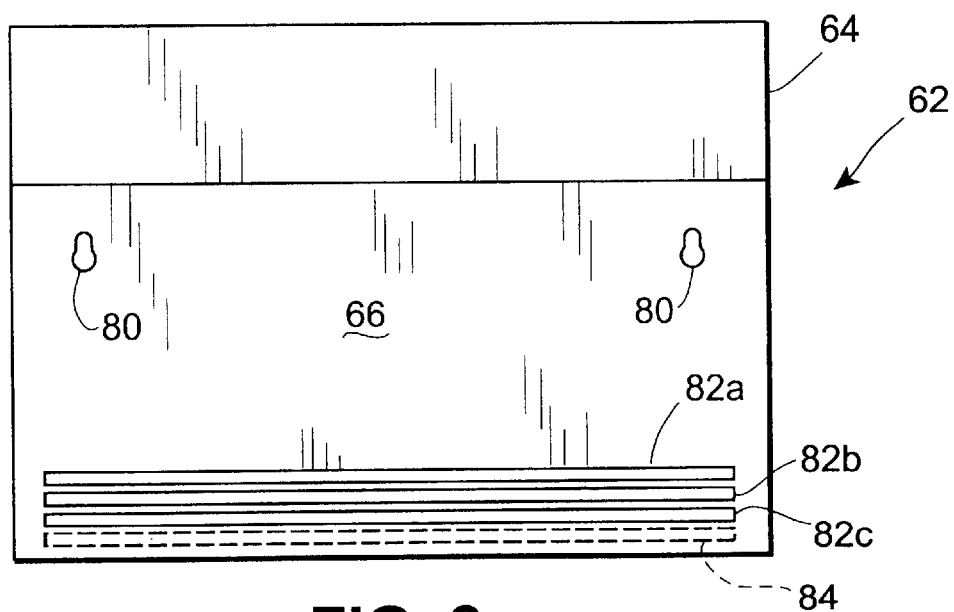
FIG. 8 is a rear view of the pocket shown in FIG. 7.
Figure 9:
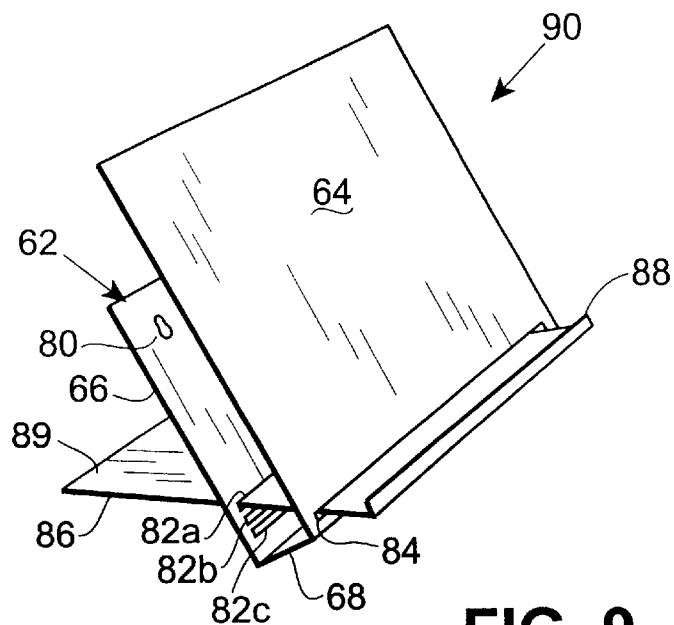
FIG. 9 is a pictorial view of a third embodiment of the notebook computer stand of the present invention.
Figure 10:
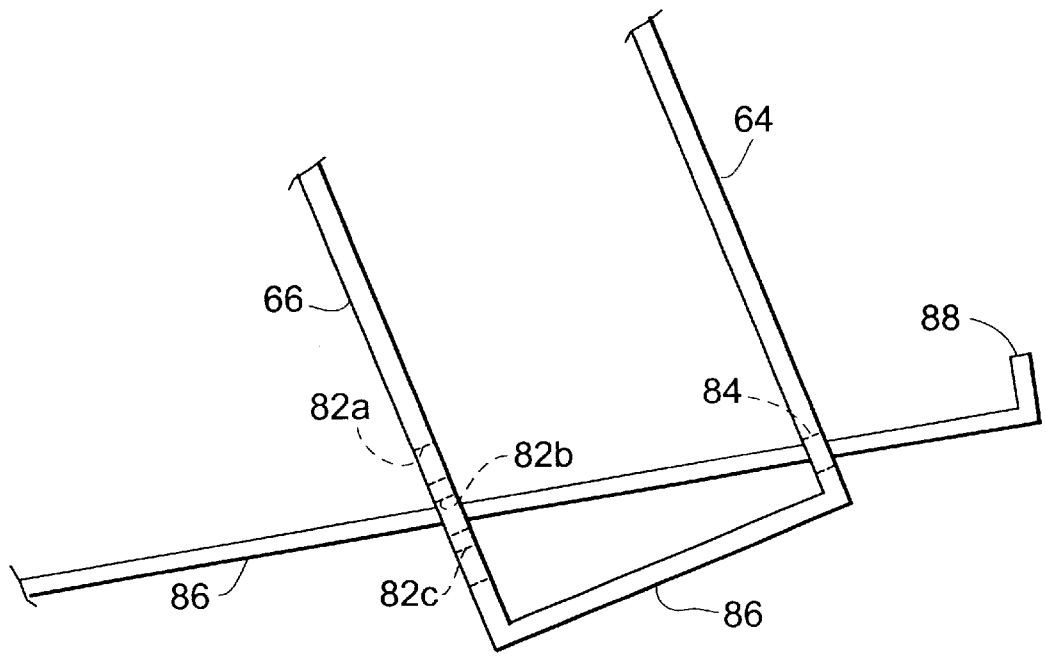
FIG. 10 is a detail of the computer stand shown in FIG. 9.

Referring now to FIGS. 8–10, shown therein is the pocket 62 of the notebook computer stand 60. Mounting slots 80 in the back 66 permit vertical mounting of the pocket 62 on wall mounts (not shown). It will be understood by one skilled in the art that the wall mounts can be screw heads or nail heads. According to this embodiment of the present invention, the pocket 62 and the wall mounts, taken together, create a notebook computer stand.

Still referring to FIGS. 8–10, the pocket 62 has horizontal slots 82a, 82b, 82c in the back 66 and a single horizontal slot 84 in the front 64. A selected horizontal slot 82 and the horizontal slot 84 cooperatively receive a sheet member 86 having a lip 88 at one end (See FIG. 9) and a distal end portion 89. A notebook computer stand 90 is assembled by sliding the end of the sheet member 86 distal from the lip 88 through the horizontal slot 84 in the front 64 and then through one of the horizontal slots 82a, 82b, 82c in the back 66 of the pocket 62. The notebook computer stand 90 is supported on a horizontal surface by the distal end portion 89 of the sheet member 86 and the bottom 68 of the pocket 52. Placement of the sheet member 86 through horizontal slot 82c in the back 66 causes the pocket 62 to tilt slightly in a generally backward direction. Deployment of the sheet member 80 through horizontal slot 82b results in an increased tilt of the pocket 62, and deployment of the sheet member 80 through horizontal slot 82a results in a still further increased tilt of the pocket 62.

FIG. 10 is a detail of FIG. 9 showing the horizontal slots 82a, 82b, 82c in the back 66 of the pocket 62 and the horizontal slot 84 in the front 64 of the pocket 62. As illustrated in FIG. 10, the sheet member 86 extends through horizontal slot 82b and horizontal slot 84 in a mid-tilt position according to the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A notebook computer stand for notebook computers used in conjunction with a conventional PC keyboard and a conventional PC mouse, wherein the notebook computer is characterized as having a relatively thicker frame portion containing a battery, a CPU, a hard drive, and other hardware, and a display portion hingedly attached to the frame portion and, further, wherein the display portion is hinged between a storage position, wherein the relatively thinner portion is folded against the frame portion, and a use position, wherein the display portion is unfolded and moved away from the frame portion, the notebook computer being connected to the conventional PC mouse and the conventional PC keyboard by cables, said notebook computer stand comprising:

a pocket for receiving the frame portion of the notebook computer; and support means for supporting said pocket, so that the frame portion of the notebook computer is disposed within said pocket and the hinged display portion of the notebook computer is in the use position, said support means comprising a cable guide attached to said pocket, said cable guide having a first cable slot and a second cable slot, wherein the keyboard cable and the mouse cable are threaded through said first cable slot and said second cable slot prior to connection to the frame portion of the notebook computer.

2. The device of claim 1, wherein said support means further comprises at least two height adjusters in said generally horizontal plate, each said height adjuster comprising a nut welded to the top of said generally horizontal plate, a bolt disposed through a bore in said generally horizontal plate, said threaded bolt being characterized as having a head and a threaded portion, said bore being generally aligned with the threads of said nut, said threaded portion of said bolt engaging the threads of said nut, so that, as said bolt is threaded into said nut, said head of said bolt moves relatively nearer said generally horizontal plate, thereby adjusting the height of said horizontal plate above the work surface.

3. The device of claim 1, wherein said pocket is formed by a front member, a back member, and a bottom member.

4. The device of claim 1, wherein said support means comprises two generally vertically members attached to a horizontal base, so that said U-shaped pocket is received between said vertical members.

5. The device of claim 2, wherein said support means further comprises at least two pads on the bottom of said generally horizontal plate.

6. The device of claim 3, wherein said pocket further comprises a lip attached to said front member.

7. The device of claim 3, wherein said pocket further comprises at least one spacer attached to said front member, said spacer being within said U-shaped pocket, so that the frame portion of the notebook computer is forced against said back member of said pocket, thereby preventing the keys of the notebook computer from contacting said front member of said pocket.

8. The device of claim 3, wherein said pocket has a front horizontal slot in said front member located adjacent said bottom member, said pocket has at least two back horizontal slots in said back member, and wherein said support means comprises a sheet member disposed through said front horizontal slot and one of said back horizontal slots, said sheet member being characterized as having a back portion and front portion, so that said notebook computer stand is supported on the work surface by said back portion of said sheet member and by a portion of said bottom of said pocket, and further, so that said front portion of said sheet member extends outwardly from said front member of said pocket to create a lip.

9. A notebook computer stand for notebook computers used in conjunction with a conventional PC keyboard and a conventional PC mouse, wherein the notebook computer is characterized as having a relatively thicker frame portion containing a battery, a CPU, a hard drive, and other hardware, and a display portion hingedly attached to the frame portion and, further, wherein the display portion is hinged between a storage position, wherein the relatively thinner portion is folded against the frame portion, and a use position, wherein the display portion is unfolded and moved away from the frame portion, the notebook computer being connected to the conventional PC mouse and the conventional PC keyboard by cables, said notebook computer stand comprising:

a pocket for receiving the frame portion of the notebook computer; and support means for supporting said pocket, so that the frame portion of the notebook computer is disposed within said pocket and the hinged display portion of the notebook computer is in the use position, said support means comprising a cable guide attached to said pocket, said cable guide having a cable slot wherein the keyboard cable and the mouse cable are threaded through said cable slot prior to connection to the frame portion of the notebook computer.

10. The device of claim 9, wherein said support means comprises two generally vertically members attached to a horizontal base, so that said U-shaped pocket is received between said vertical members.

11. The device of claim 9, wherein said pocket is formed by a front member, a back member, and a bottom member.

12. The device of claim 9, wherein said support means further comprises at least two pads on the bottom of said generally horizontal plate.

13. The device of claim 9, wherein said support means comprises two generally vertically members attached to a horizontal base, so that said U-shaped pocket is received between said vertical members.

14. The device of claim 11, wherein said pocket further comprises a lip attached to said front member.

15. The device of claim 11, wherein said pocket further comprises at least one spacer attached to said front member, said spacer being within said U-shaped pocket, so that the frame portion of the notebook computer is forced against said back member of said pocket, thereby preventing the keys of the notebook computer from contacting said front member of said pocket.

16. The device of claim 11, wherein said pocket has a front horizontal slot in said front member located adjacent said bottom member, said pocket has at least two back horizontal slots in said back member, and wherein said support means comprises a sheet member disposed through said front horizontal slot and one of said back horizontal slots, said sheet member being characterized as having a back portion and front portion, so that said notebook computer stand is supported on the work surface by said back portion of said sheet member and by a portion of said bottom of said pocket, and further, so that said front portion of said sheet member extends outwardly from said front member of said pocket to create a lip.

\* \* \* \* \*